United States Patent [19]

Dazen et al.

[11] 3,940,908
[45] Mar. 2, 1976

[54] NUCLEAR FUEL PELLET LOADING MACHINE

[75] Inventors: John R. Dazen, Cheswick; John V. Denero, Leechburg, both of Pa.

[73] Assignee: Westinghouse Electric Corporation, Pittsburgh, Pa.

[22] Filed: June 13, 1972

[21] Appl. No.: 262,377

[52] U.S. Cl. ............... 53/59 R; 53/77; 53/126; 53/258
[51] Int. Cl. ................................ B65b 57/10
[58] Field of Search ......... 53/59, 77, 126, 244, 258

[56] References Cited
UNITED STATES PATENTS

| | | | |
|---|---|---|---|
| 1,774,401 | 8/1930 | Quade et al. | 53/244 X |
| 3,212,226 | 10/1965 | Murray et al. | 53/24 |

*Primary Examiner*—Travis S. McGehee
*Attorney, Agent, or Firm*—J. R. Campbell

[57] ABSTRACT

A nuclear fuel pellet loading machine including an inclined rack mounted on a base and having parallel spaced grooves on its upper surface arranged to support fuel rods. A fuel pellet tray is adapted to be placed on a table spaced from the rack, the tray having columns of fuel pellets which are in alignment with the open ends of fuel rods located in the rack grooves. A transition plate is mounted between the fuel rod rack and the fuel pellet tray to receive and guide the pellets into the open ends of the fuel rods. The pellets are pushed into the fuel rods by a number of mechanical fingers mounted on a motor operated block which is moved along the pellet tray length by a drive screw driven by the motor. To facilitate movement of the pellets in the fuel rods the rack is mounted on a number of spaced vibrators which vibrate the fuel rods during fuel pellet insertion. A pellet sensing device movable into an end of each fuel rod indicates to an operator when each rod has been charged with the correct number of pellets.

15 Claims, 5 Drawing Figures

NUCLEAR FUEL PELLET LOADING MACHINE

BACKGROUND OF THE INVENTION

The heat producing core of one well known design of nuclear reactor contains multiple fuel assemblies which include a total of about 21000 fuel rods. Each fuel rod contains 240 fuel pellets used to generate heat during the reactor fission process. It therefore is apparent that more than five million pellets must be loaded into the fuel rods during the manufacturing operation. Regardless of the size of the reactor the task of loading or charging fuel rods with such a massive quantity of pellets constitutes a major factor in the reactor construction costs and in the construction time needed to fabricate a complete reactor.

According to present invention practices, the pellets are manually inserted in the fuel rods by utilizing various designs of stands and tables which support the rods in fixed predetermined positions relative to a tray containing about 25 columns of fuel pellets. Each column is accurately aligned axially with an open end of its corresponding fuel rod and an operator then manually pushes four or five columns of pellets simultaneously into the hollow rods until the pellet tray is empty. The tray is then replaced with a new supply of pellets and the process repeated about five times until each rod is full. Plugs are then welded in both ends of each rod to retain the pellets therein.

The primary disadvantage of this process is the inherent inefficiency and consequent high labor costs resulting from the effort involved in manually inserting the fuel pellets. Both the pellets and the rods are manufactured to exacting tolerances thereby requiring the pellet columns to be accurately aligned in both the X and Y planes of each rod during the loading operation. Should misalignment occur, the complete operation must be stopped until the defect is remedied. Inefficiency is particularly evident when the pellets tilt and consequently jam in the rod barrel during loading. Under this condition, the operator cannot exert sufficient force on the end of the column of pellets to break the jam and thereby free the rod for further loading. To break the jam, the rod must be lifted and vibrated manually with a mallet, or the like, to loosen the pellets from their jammed position. Upon pellet loosening, the rod must again be located in its appreciate groove and the tray then reset to continue the loading operation. Because all steps in the loading operation must be performed manually, the time to fill 20 thousand or so rods for a reactor results in direct labor costs which are disproportionately high when compared to other costs in the manufacturing cycle.

BRIEF SUMMARY OF THE INVENTION

Briefly stated, the above disadvantages are eliminated in accordance with the teachings of this invention by providing an automatically operating pellet loading machine which mechanically loads pellets into fuel rods with only minimum manual effort. The machine imparts a uniform force of predetermined magnitude to each column of pellets to push them into corresponding rods placed in alignment therewith. Such force limiting features sense fuel pellet jamming conditions which relieves the applied force on the affected fuel pellet column only and permits continuation of loading of pellets into the remaining fuel rods not affected by the jammed condition. To help free jams and to assist movement of pellets after entry into each rod, the rods are vibrated mechanically by magnetically operating vibrators associated with the fuel rod support rack. Additional sensing devices are provided to determine when each rod is properly charged with the correct number of pellets.

An object of the invention therefore is to provide a fuel pellet loading machine which automatically loads fuel pellets into nuclear reactor fuel rods.

Another object of the invention is the provision of a pellet loading machine which vibrates fuel rods during the time fuel pellets are being loaded thereinto to facilitate the loading process and to minimize jamming of pellets in the fuel rods.

Another object of the invention is to provide a fuel pellet loading machine which mechanically pushes columns of fuel pellets from a loading tray into a transition device prior to moving the pellets into fuel rods.

Still another object of the invention is to provide a fuel pellet loading machine which varies the rate of insertion of pellets into fuel rods during a pellet loading operation.

BRIEF DESCRIPTION OF THE DRAWINGS

While the specification concludes with claims particularly pointing out and distinctly claiming the subject matter of the invention, it is believed the invention will be better understood from the following description taken in conjunction with the accompanying drawings, wherein:

Figure 1:
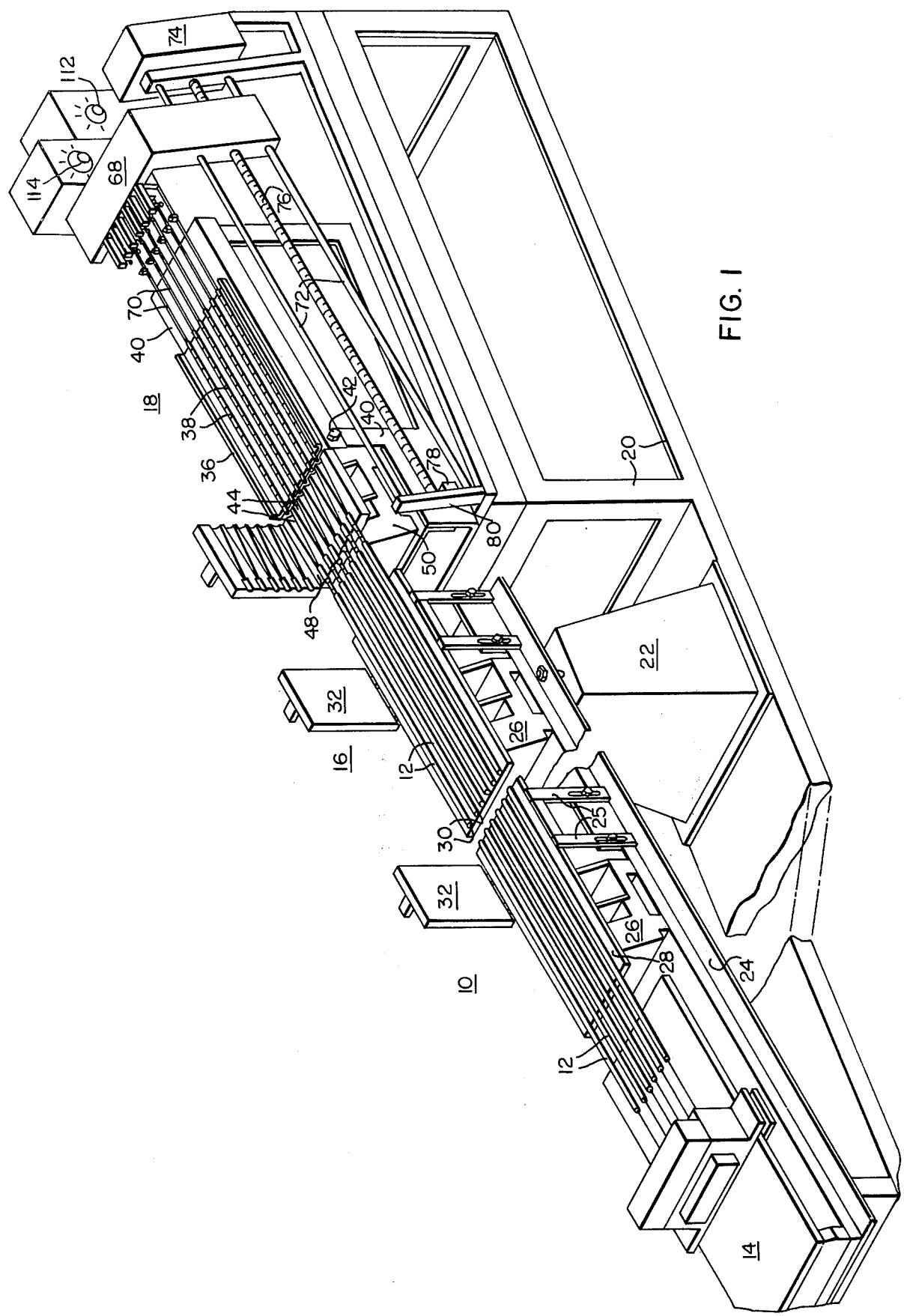
FIG. 1 is an isometric view showing the pellet loading machine of this invention.

Referring now to the drawings wherein like reference characters designate like or corresponding parts throughout the several views, there is shown in FIG. 1, a loading machine 10 designed to automatically load multiple columns of pellets into fuel rods 12 adapted for use in a nuclear reactor. The machine generally comprises three separate sections including a fuel pellet sensing table 14, fuel rod support rack 16 and a pellet table 18 having control mechanisms connected thereto. These sections are supported on a base of horizontally and vertically disposed angle irons 20 and a stand 22 arranged to permit positioning the machine at an angle of about 8° to the horizontal.

The fuel rod rack 16 includes base 24 having channel shaped brackets 25 which hold vibrators 26 spaced at about 2½ foot intervals along the support rack length. The rack upper portion comprises a plate 28 bolted or otherwise secured to the top of vibrators 26 and of a length substantially less than the fuel rods 12. To accommodate positioning of fuel rods in the machine for pellet loading purposes, the plate 28 surface contains a multiplicity of semi-circular grooves 30 having a size corresponding to the outer dimensions of fuel rods 12 which are shown positioning in the grooves for pellet loading purposes. Clamps 32 hinged to a side of plate 28 are movable to a position overlying the fuel rods to hold the rods against displacement during the pellet loading operation. If desired, the clamp 32 surface may have complementary grooves for holding the rods in place. Since the open ends of the fuel rods must be located precisely with respect to the pellet columns positioned in a loading tray, plate 28 may be further adjusted vertically on base 24 by a conventional bolt-slot arrangement 34.

The pellet table 18 linearly spaced from fuel rod rack 16 supports a removable tray 36 which feeds pellets 38 into the fuel rods. Table 18 likewise has a flat surface and is vertically adjustable on framework 40 by a bolt and slot arrangement 42. Since the table surface should be disposed at an angle of about 8° ± 1° with the horizontal to assist movement of pellets into the rods, the framework bars 40 are chosen to provide such angle when the table is secured thereto.

The pellet tray 36 is adapted to be placed on the table surface for providing a source of pellets which are fed into the fuel rods. To help assure exact alignment of the pellet columns with the fuel rod ends, a number of parallel bars 37, FIG. 3, spaced a distance less than pellet diameter are welded or otherwise secured to the tray surface. These bars all lie in the same plane and therefore provide parallel channels in which the pellets 38 rest in the form of pellet columns. FIG. 1 illustrates an arrangement of the machine wherein six columns of fuel pellets 38 are located on the tray surface and each of these columns is positioned in exact alignment with a groove 46 in a transition plate 48 located between the end of the fuel rods 12 and the end of the tray containing the columns of pellets. Obviously, the mechanism can be varied in size to accommodate a greater or less number of fuel pellet columns, for example, a typical tray design includes twenty five pellet columns.

Figure 2:
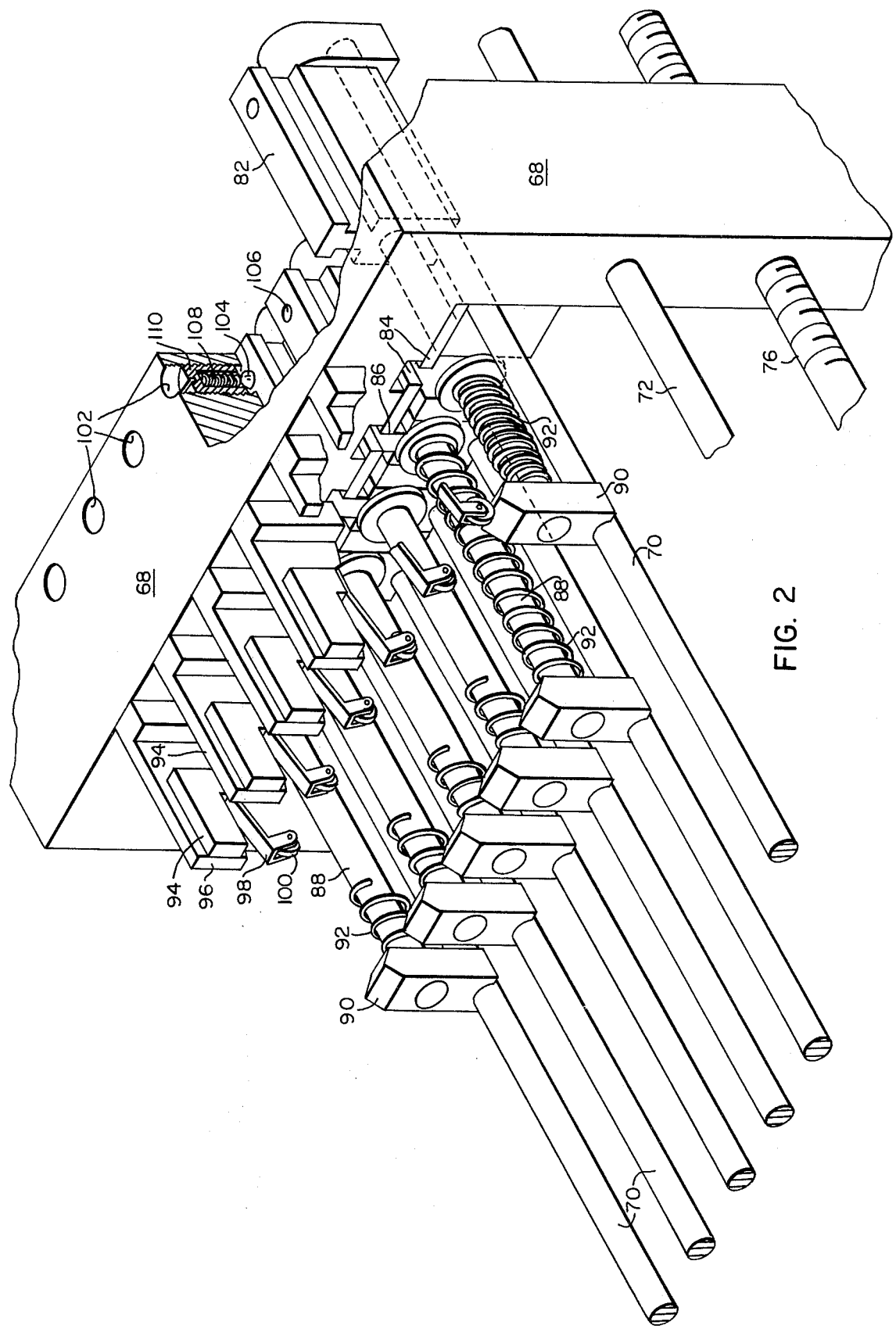
FIG. 2 is an isometric view of mechanism used in pushing fuel pellets into aligned fuel rods.

As illustrated in FIGS. 1 and 2, the transition plate 48 is adjustably mounted to a pair of upstanding bars 50 which are secured to base 20. The upper surface of the plate is provided with multiple semi-circular grooves 52 having a diameter only slightly larger than the diameter of a pellet. The plate further is provided with a ledge 54 which serves as a stop for the upper ends of the fuel rods. With the fuel rods placed in position on the transition plate, a stockade clamp 56 having complementary semi-circular grooves 58 milled in its surface is arranged to be placed over the fuel rods to prevent their displacement during the fuel pellet loading operation. During forward travel, each fuel pellet is pushed through the accurately machined funnel-shaped stockade clamp having a 2½° lead-in angle to help assure smooth transition of pellets from the tray into a receiving fuel rod.

Figure 3:
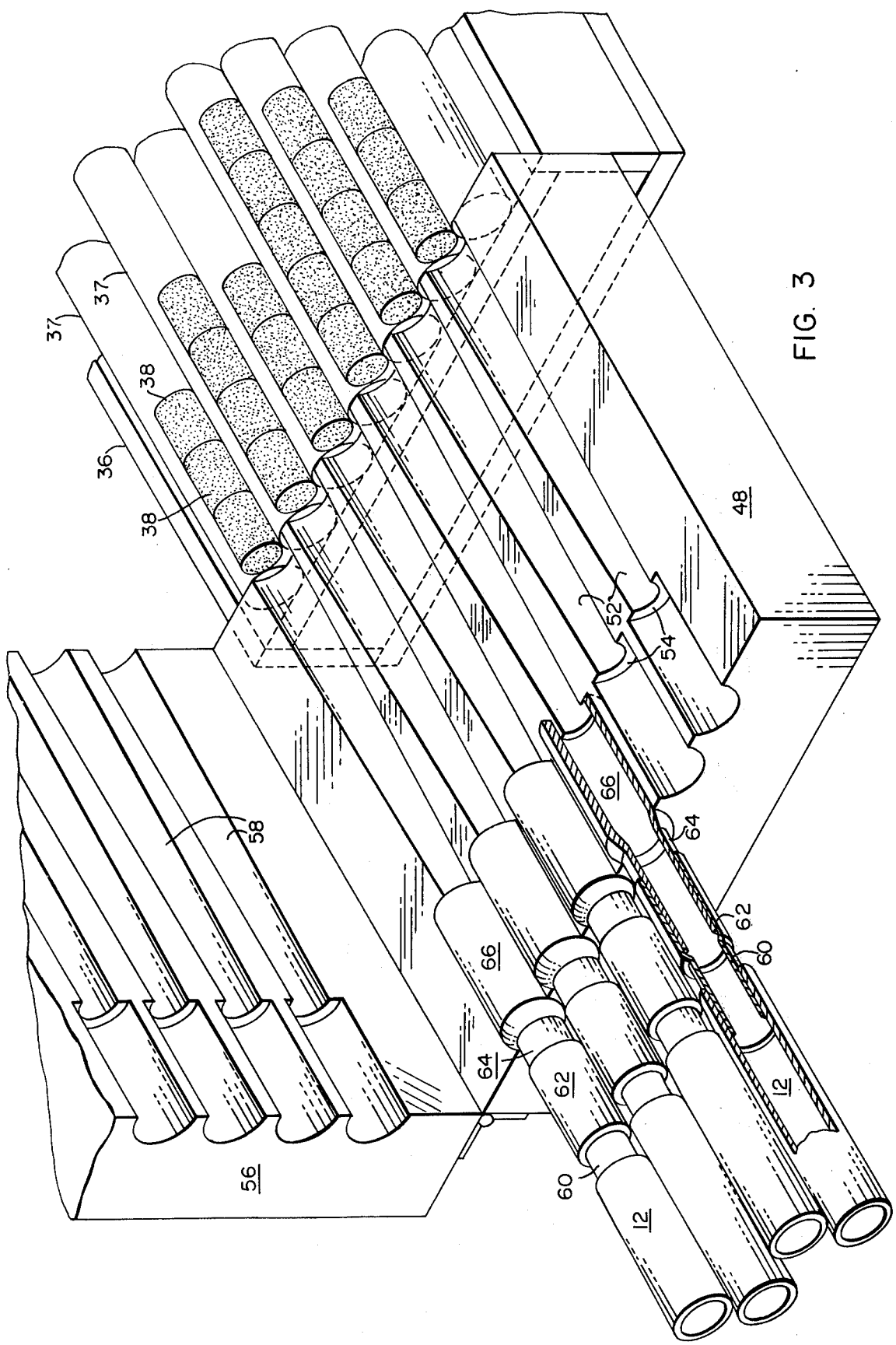
FIG. 3 illustrates the design of a transition device which transfers fuel pellets from a loading tray to the fuel rods.

Movement of the pellets from the transition piece into each fuel rod is accomplished by a device of the design illustrated in FIG. 3. As shown, a thin wall stainless steel anti-contamination funnel 60 is inserted in the open end of each fuel rod while the flared end 62 fits over a complementary-shaped section 64 of a heavy walled Zircaloy or stainless steel lead-in funnel 66. The thickness of funnel 60 should range between 0.001 inch – 0.0015 so that after pellets enter the fuel rod, there still is only limited clearance between the pellet outside surface and the inside walls of the rod to minimize the likelihood of pellet jamming during the time they are being charged into the rod. Upon completion of the loading process, the funnels are removed and discarded.

This funnel arrangement has been found particularly useful in those situations where a radioactive material such as plutonium is loaded into the fuel rods. Experience shows that where a funnel is not used, minute particles of the radioactive material is scraped off the sides of the pellet as they are loaded into the fuel rod. The powdery substance thus resulting from the operation accumulates on the entrance end of the rod and unless it is thoroughly cleaned prior to welding a plug in the rod end, the plutonium infiltrates the weld material which then becomes radioactive. As is known, such radioactive material cannot thereafter be removed by scrubbing or other methods. By utilizing the funnel arrangement illustrated in FIG. 3, the problem caused by plutonium or other radioactive materials are eliminated since upon completion of the loading process, the funnels are treated as a highly contaminated dispensible item.

Referring now to the pellet table 18 and the mechanism used for pushing fuel pellets 38 into the fuel rods 12, there is shown in FIGS. 1 and 2, a block 68 having multiple mechanical fingers 70 extending outwardly therefrom and in a direction to engage the columns of fuel pellets in pellet tray 36. The block 68 is slidably mounted on a pair of spaced bars 72 located on each side of the mechanism. To provide for movement of the block 68 in a direction in line with the fuel pellets on the tray, a motor and gear box arrangement 74 rotates a drive screw 76 which engages internal screw threads in block 68. It will be apparent to those skilled in the art that hydraulic or air motors for example may be used in lieu of an electric motor. As motor 84 rotates the drive screw, coaction between the drive screw and block 68 internal threads causes the block to move along the drive screw length thus moving the fingers 70 into contact with the respective fuel pellet columns positioned in the fuel pellet tray. A micro-switch 78 conveniently mounted on drive screw support 80 reverses the applied voltage to drive screw motor 74 when block 68 reaches its end of travel, thus causing the block to return to its start position. At this time, all pellets in the tray have been inserted in the fuel rods 12.

During the course of loading fuel pellets into the fuel rods, it is desirable that an excessive force not be used in driving the fuel pellets into position since pellet jamming might otherwise occur. The structure shown in FIG. 2 effectively minimizes the likelihood of such jamming by limiting the amount of force which is applied by the pusher fingers against the fuel pellet columns. As shown, each of several mechanical fingers 70 is firmly anchored in a holder 82 of T-shape configuration mounted for sliding movement on inwardly directed flanges 84 milled in block 68. Each holder normally lies flush with the face of block 68, as indicated at 86, but is mounted in a manner to slide rearwardly out of the block. A bar 88 is also secured at one end in the holder 82 and terminates at its other end in a stop member 90 which is attached, as by welding, to each mechanical finger 70. Compression spring 92 bears at one end against member 90 and at its other end against the face of block 68. A plurality of micro-switches 94 are mounted on arms 96 extending forwardly from block 68. Each switch includes a switch arm 98 having a roller 100 in its outer end. To hold each holder 82 in place, holes 102 bored in block 68 contain a ball 104 which is urged into a detent 106 by spring 108. The housing 110 for the spring and ball is screw threaded into block 68 to thereby permit adjusting the spring to different compression amounts.

During the time pellets are being loaded in fuel rods, as a finger meets resistance to in pushing pellets into a rod and the force exceeds 5 pounds, the finger and its attached holder 82 will move rearwardly out of its T-shaped slot and spring 92 simultaneously will compress. Should the resistance to pellet movement in the affected fuel rod be relieved, the spring will urge holder 82 back into its normal position in block 68 and the finger will continue pushing the pellets into the rod in synchronism with other fingers. However, should such resistance not be relieved, thus indicating a jammed condition in the fuel rod, the holder 82 will stay retracted until all pellets are loaded into the other fuel rods. As block 68 then reaches the end of its forward movement, micro-switch 78 will close and reverse current flow in motor 74 windings and thus move block 68 rearwardly on drive screw 76 until it reaches its initial or start position.

Under some circumstances it may be desirable to move pellets into the fuel rods at different speeds. Motor 74 therefore is a variable speed motor having appropriate controls 112 which act to vary the motor speed and the rate of movement of fuel pellets into the fuel rods. Also, a control mechanism 114 is provided to vary the frequency and magnitude of vibration imparted to the fuel rack 16 by vibrators 26 on which the rack is positioned.

Figure 4:
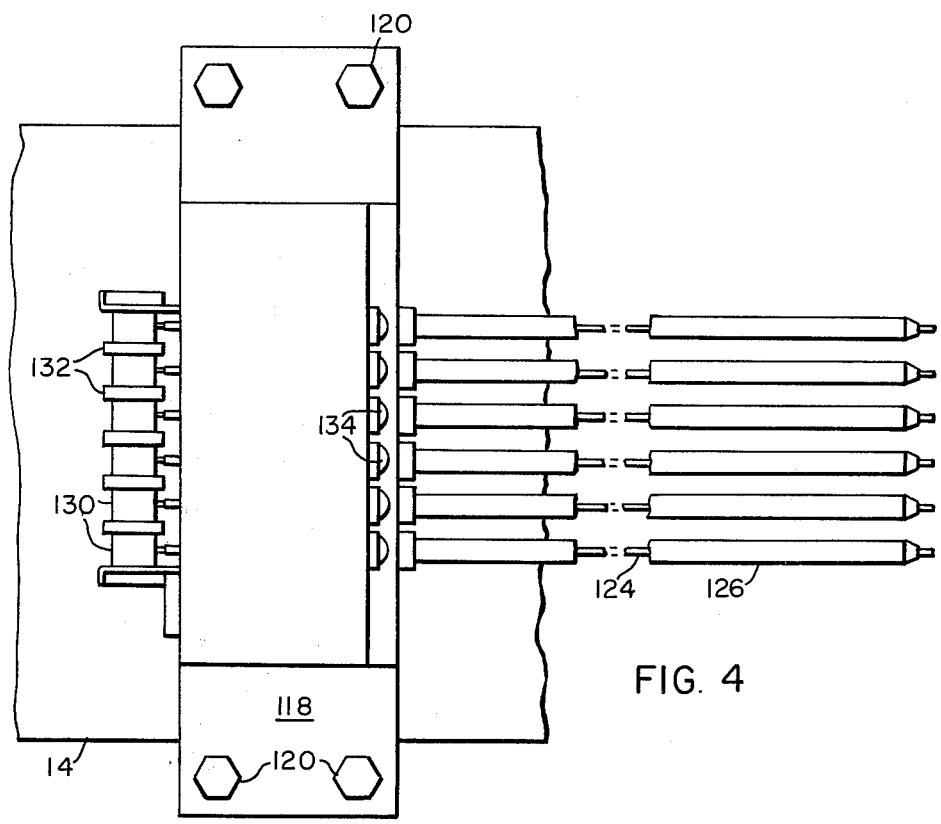
FIG. 4 is a plan view of a sensing device which indicates when each fuel rod is full.
Figure 5:
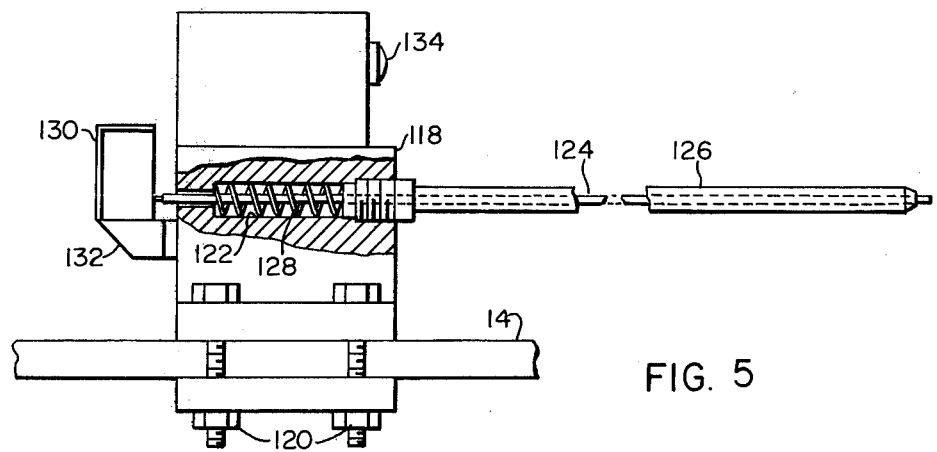
FIG. 5 is a sectional view of the device of FIG. 4.

In order to determine when a fuel rod is loaded with the correct number of fuel pellets, a sensing mechanism 116 of the type illustrated in FIGS. 4 and 5 is installed on table section 14. The mechanism includes a block 118 secured to the table top by bolts 120. The block contains a multiplicity of bores 122 positioned in alignment with the fuel rods. An inner pin 124 located in a cylindrical tube 126 is positioned in each of the bores and is of a length sufficient to extend outwardly from each side thereof. A spring 128 in each of the bores biases the pin 124 in an outward direction toward the fuel rods. A number of microswitches 130, one for each inner pin, are mounted in brackets 132 attained to the back side of block 118.

With fuel rods 12 set in place on rack 16 and prior to loading fuel pellets into the fuel rods, block 118 is moved forwardly on table 14 until the end of each inner pin 124 extends a short distance into each fuel rod. As the pellets come down the rod and reach their final position, the weight of the pellets move the inner pin rearwardly until it contacts its respective microswitch. Upon closing the switch, a circuit is completed to a signal light 134 which indicates to the operator that the pellets have reached the desired position in the fuel rods.

In operation, the pellet sensing table 14, fuel rod support rack 16 and the pellet table 18 are aligned accurately with one another by the adjusting means provided between the tables and the framework on which they are mounted. The desired work angle of 8° ± 1° provides a slope to the fuel rods which helps facilitate movement of fuel pellets 38 therein. Fuel rods 12 having funnels in the ends thereof are then placed in grooves 30 provided in the support rack with their ends terminating in the transition plate 48. Block 118 on the fuel pellet sensing table 14 is moved forwardly and pins 124 are inserted in the other end of the fuel rods. A pellet tray having a number of columns of pellets corresponding to the number of fuel rods to be loaded, is placed on the fuel pellet table and moved alignment with the grooves provided in the transition plate. The stockage clamp and other clamps are then moved to a closed position to hold the fuel rods in position during the loading process.

With the machine thus prepared in this manner, the drive screw motor 74 is started and the vibrators 26 energized to vibrate the fuel rods in the support rack. To commence loading, the drive screw 76 is rotated in a direction to cause the block containing the mechanical fingers to move in a fuel pellet loading direction. The fingers thereupon engage the end of each column of fuel pellets and push the pellets from the tray into the transition plate and from there into the open ends of the fuel rods. In the event the tray is not large enough to accommodate the required number of pellets for a fuel rod, it is reloaded and the process repeated until the rods are full. During the time pellet loading is taking place, the fuel rods are vibrated to help move the pellets along the fuel rod length. The rate of movement of fuel pellets into the rods is controlled by the drive screw motor and the vibrator 26 frequency and amplitude of vibration may be varied depending on the fuel rod and pellet material dimensions. In the event one of the rods becomes jammed with pellets, the block 68 will continue moving forward but the mechanical finger associated with the jammed fuel rod will cause the T-shaped holder 82 to move out of block 68. This action relieves the force on the jammed rod and permits continued movement of the block and the remaining mechanical fingers toward the pellet loading position. If desired, the jammed fuel rod may then be removed to an area where the jammed condition can be remedied. Upon reinsertion of the T-shaped member and the spring and ball arrangement in the block, the process can then be renewed without interruption.

In view of the above it will be apparent that many modifications and variations are possible in light of the above teachings. It therefore is to be understood that within the scope of the appended claims the invention may be practiced other than as specifically described.

What is claimed as new is:

1. A machine for loading fuel pellets into fuel rods to be used in a nuclear reactor comprising:
   a base supporting a rack arranged to hold a multiplicity of fuel rods in a stationary position;
   means on the base in longitudinal alignment with said rack for holding multiple columns of fuel pellets respectively corresponding to the number of fuel rods;
   said means and said rack being inclined at an angle to the horizontal; and a power driven device on said base having members arranged to contact said columns of fuel pellets to feed said pellets into said fuel rods.

2. The combination according to claim 1 wherein said power driven device includes a power driven block movable on said base; and
   said members comprise mechanical fingers on said block positioned in alignment with said columns of fuel pellets so that upon movement of said block the fingers engage said columns of pellets to urge said pellets into said fuel rods.

3. The combination according to claim 2 including means mounted in said block for relieving the force applied by said block to any one of said fingers in the event pellets jam in any one of said fuel rods.

4. The combination according to claim 1 wherein said power driven device comprises a block and said members comprise mechanical fingers thereon in axial alignment with said columns of fuel pellets;
- means on said base arranged to support said block and to facilitate its movement in a direction towards said fuel rods; and
- a controllable speed motor connected with said block for moving it in a direction toward said fuel rods thereby causing said fingers to contact the ends of said columns of fuel pellets to move the pellets into said fuel rods as said block moves in the fuel rod direction.

5. The combination according to claim 4 wherein a drive screw is supported on said base and extends through said block;
- a motor driven gear reducer connected with said drive screw to rotate it at a preselected speed;
- a bore in said block having internal threads complementary to said drive screw;
- whereby upon actuation of said motor, said drive screw rotates and causes said block to traverse the drive screw length and move the fingers on said block into engagement with the ends of said fuel pellet columns to drive the fuel pellets into said fuel rods.

6. The combination according to claim 4 including a switch mounted on said base in a location for contact by the block when the block reaches its end of travel; and
- means connected with said switch and motor for reversing the motor to cause said block to return to its start position.

7. The combination according to claim 1 including vibration means mounted on said base and wherein said rack is supported by said vibration means; and
- a control system connected to said vibration means for controlling the frequency and amplitude of vibratory forces imparted to said fuel rods.

8. The combination according to claim 1 wherein transition means are interposed between said columns of fuel pellets and said fuel rods for facilitating the movement of said fuel pellets into said fuel rods.

9. The combination according to claim 8 wherein said transition means includes a plate adjustably mounted on said base;
- said plate including a multiplicity of semi-circular grooves in alignment with said columns and corresponding to the dimensions of said pellets;
- a clamp mount on said plate and having multiple grooves therein complementary to the grooves in said plate for providing passageways through which said fuel pellets move prior to being inserted in the fuel rods.

10. The combination according to claim 1 wherein funnel means are attached to the loading end of each of said fuel rods, said funnel means having an opening therein of a size greater than said fuel pellets for channeling said fuel pellets into said fuel rods.

11. The combination according to claim 10 wherein said funnel means comprises a first funnel insertable in the loading end of each of said fuel rods and having a flared end extending outwardly therefrom; and
- a second funnel of similar design having an end insertable in the flared end of each of said first funnels;
- said funnels being positioned to guide fuel pellets into each of said fuel rods.

12. The combination according to claim 1 wherein a table is positioned in alignment with the end of said fuel rods opposite from the feed end;
- fuel pellet sensing means mounted on said table, said sensing means having a member associated with an end of each of said fuel rods for determining the position of pellets loaded therein.

13. The combination according to claim 12 wherein said sensing means comprises a multiplicity of pins, each pin being adapted to extend into an end of each of said fuel rods; and
- visual indicating means arranged to be actuated by each of said pins and which illuminate when the first pellet loaded in each of said fuel rods engages any one of said pins.

14. The combination according to claim 13 wherein a biasing device in said sensing means holds said pin in a predetermined position; and
- multiple switches mounted on said sensing means, each of said switches being aligned with a pin and positioned to be engaged by an end of said pin so that when said pellets move said pin in a rearward direction, it engages said switch which illuminates said visual indicating means.

15. A machine for loading fuel pellets into fuel rods to be used in a nuclear reactor comprising a base having at least one vibrator attached thereto and a fuel rod rack attached to the upper surface of said vibrator;
- grooves in said rack for respectively receiving fuel rods;
- a table on said base supporting a fuel pellet tray, said tray having means thereon for receiving multiple columns of fuel pellets;
- said rack and table being mounted on said base at an angle to the horizontal;
- means separately interconnecting said rack with the vibrators and table with said base for aligning said grooves with said pellets;
- means positioned between the pellet discharge side of said tray and the end of each of said fuel rods for channeling said fuel pellets thereinto;
- drive means on said base having mechanical fingers thereon in alignment with each of said fuel pellet columns;
- said drive means including a power actuated device which moves said fingers into engagement with the end of said fuel pellet columns to push said pellets into said fuel rod.

* * * * *